United States Patent
Dünsser et al.

(10) Patent No.: US 6,216,181 B1
(45) Date of Patent: Apr. 10, 2001

(54) REAL-TIME CALL DISPLAY FOR SWITCHING COMPUTER HAVING SEQUENCE PROGRAM SUPPLEMENTED BY PROGRAM MODULE THAT IMMEDIATELY FORWARDS INFORMATION VIA SEPARATE OUTPUT TO EVALUATION UNIT WITHOUT GOING VIA OPERATING SYSTEM

(75) Inventors: Elmar Dünsser, Amberg; Wolfgang Günther, München, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/148,000

(22) PCT Filed: Sep. 30, 1997

(86) PCT No.: PCT/DE97/02247

§ 371 Date: Mar. 24, 1999

§ 102(e) Date: Mar. 24, 1999

(87) PCT Pub. No.: WO98/15156

PCT Pub. Date: Apr. 9, 1998

(30) Foreign Application Priority Data

Sep. 30, 1996  (DE) .............................................. 196 40 230

(51) Int. Cl.[7] ............................. G06F 13/00; G06F 13/10
(52) U.S. Cl. ............................... 710/36; 707/10; 714/39; 714/45; 371/16
(58) Field of Search ............................. 395/155, 183.21, 395/200; 707/10; 714/39; 371/16; 710/36

(56) References Cited

U.S. PATENT DOCUMENTS

| | | | |
|---|---|---|---|
| 3,585,599 | * 6/1971 | Hitt | 340/172.5 |
| 3,825,901 | * 7/1974 | Golnek et al. | 340/172.5 |
| 4,703,446 | * 10/1987 | Momose | 364/580 |
| 5,003,595 | 3/1991 | Collins et al. . | |
| 5,206,934 | * 4/1993 | Naef | 395/200 |
| 5,347,649 | * 9/1994 | Alderson | 395/600 |
| 5,379,374 | * 1/1995 | Ishizaki et al. | 395/155 |

FOREIGN PATENT DOCUMENTS 2 253 542   9/1992 (GB) .
2253542A  * 9/1992 (GB) .

OTHER PUBLICATIONS

Passt: Position Access switching system for telephony networks—B. Eckhardt et al—614 PTR Philips Telecommunication and Data Systems Review—47 (1989) Dec., No. 4.
AXE10: Architecture—8076 British Telecommunications Engineering 8 (1989) Oct., Part 3, London.
IBM Technical Disclosure Bulletin—vol. 38, No. 3 Mar. 1995.

* cited by examiner

*Primary Examiner*—Thomas Lee
*Assistant Examiner*—Rehana Perveen
(74) *Attorney, Agent, or Firm*—Schiff Hardin & Waite

(57) ABSTRACT

In a data processing unit, in particular a switching computer that forwards message cells according to the ATM transmission method, a sequence program is supplemented by a program module that supplies items of information relating to internal sequences to an evaluation unit formed by a personal computer for display screen representation in real time, the supplying taking place via a serial interface and circumventing the operating system.

10 Claims, 3 Drawing Sheets

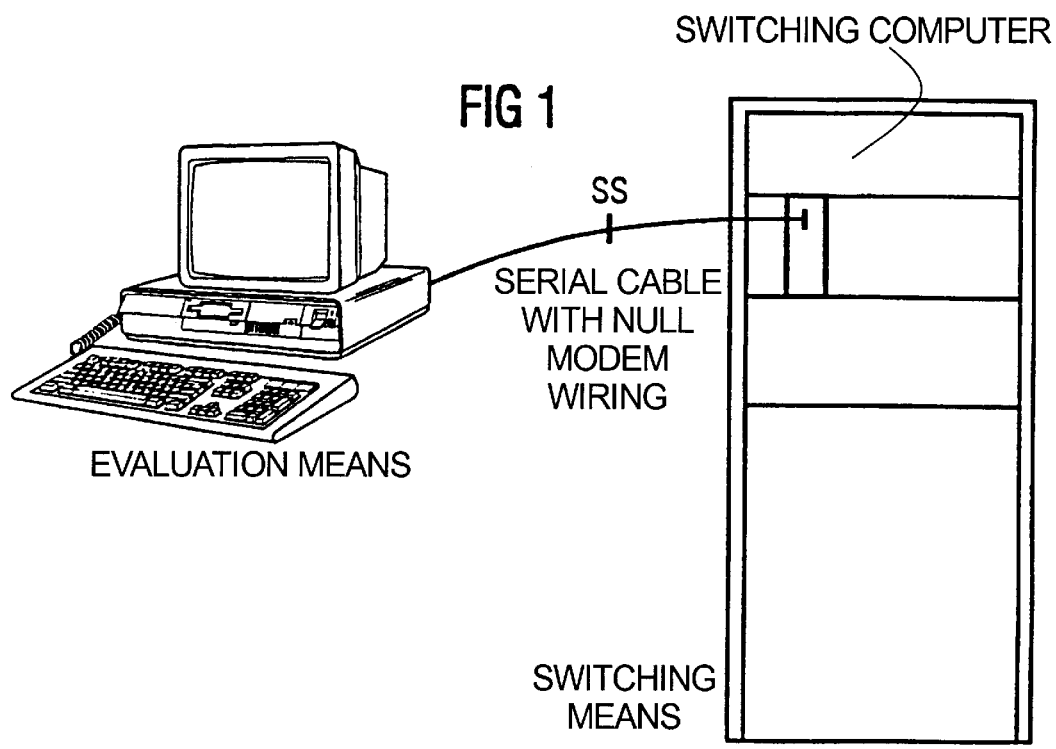
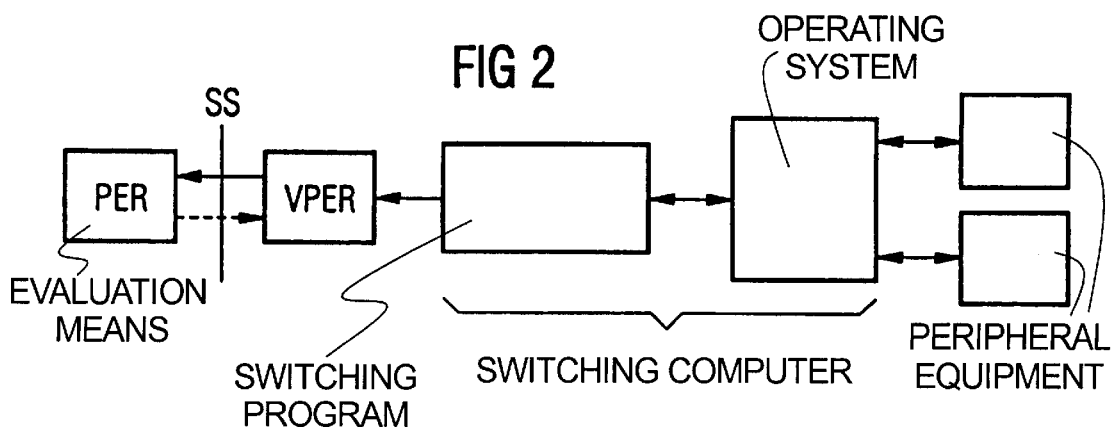

FIG 3

```
------ CALL DISPLAY V3.6 / TRACE MODE ------
              3147:45650    *START    '96.4.17 10:00:06  V3.6
A>  3148:45744    MDAT:BC_DLCI: 1200
A>  3149:45745    MSG 0   CR= 000003h   BC_DLCI= 1200 : 02h   SETUP RN=4989400104
A<  3150:45757    SIG 1   CR= 000003h   BD_DLCI= 1200 : 01h   CALL PROC
    3151:45758    ---  0  CR= 7FFBDDh   BC_DLCI= 1261/1       CR=7FFBDDh  BC_DLCI=1200
>B  3152:45763    SIG 0   CR= 7FFBDDh   BC_DLCI= 1261 : 02h   SETUP RN=4989400104
    3153:45768    MDAT:BC_DLCI: 1261
<B  3154:45769    MSG 1   CR= 7FFBDDh   BC_DLCI= 1261 : 01h   CALL PROC
    3155:45771    MDAT:BC_DLCI: 1261
<B  3156:45772    MSG 1   CR= 7FFBDDh   BC_DLCI= 1261 : 03h   CONNECT
>B  3157:45822    SIG 0   CR= 7FFBDDh   BC_DLCI= 1261 : 04h   CONNECT ACK
A<  3158:45822    SIG 1   CR= 000003h   BC_DLCI= 1200 : 03h   CONNECT
    3159:45828    MDAT:BC_DLCI:
                                        1200
A>  3160:45828    MSG 0   CR= 000003h   BC_DLCI= 1200 : 04h   CONNECT ACK
    3161:46168    MDAT:BC_DCLI: 1200
A>  3162:46169    MSG 0   CR= 0oooo2h   BC_DLCI= 1200 : 06h   RELEASE (00h)
>B  3163:46170    SIG 0   CR= 7FFBDEh   BC_DLCI= 1261 : 06h   RELEASE (10h)
    3164:46173    MDAT:BC_DLCI: 1261
<B  3165:46174    MSG 1   CR= 7FFBDEh   BC_DLCI= 1261 : 08h   RELEASE COMP
A<  3166:46198    SIG 1   CR= 000002h   BC_DLCI= 1200 : 08h   RELESASE COMP (1Fh)
00
------ COM : 38400 baud, err= 0, Trace ON, SelectMode GPE : U, PC : GO ------
```

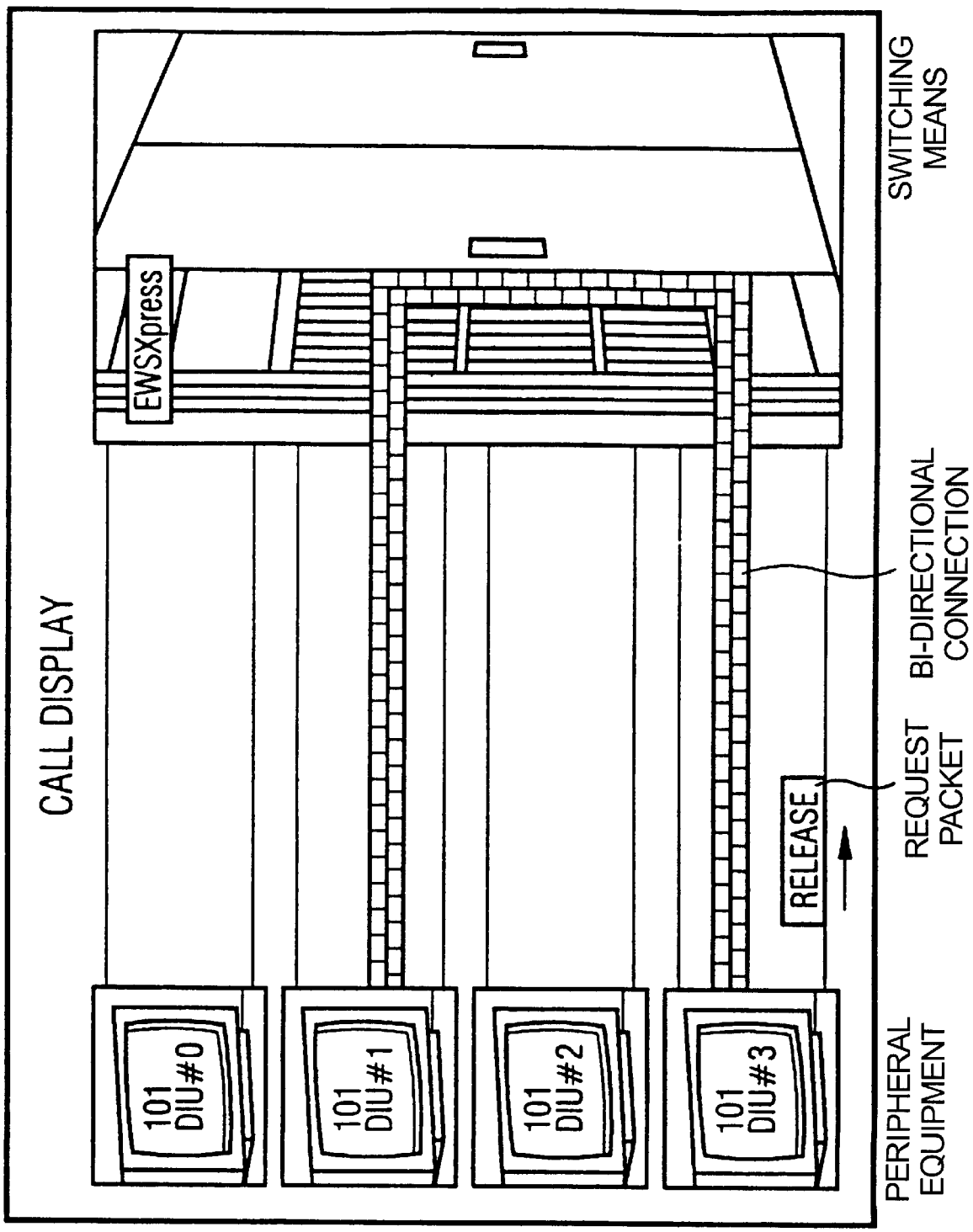

REAL-TIME CALL DISPLAY FOR SWITCHING COMPUTER HAVING SEQUENCE PROGRAM SUPPLEMENTED BY PROGRAM MODULE THAT IMMEDIATELY FORWARDS INFORMATION VIA SEPARATE OUTPUT TO EVALUATION UNIT WITHOUT GOING VIA OPERATING SYSTEM

BACKGROUND OF THE INVENTION

The subject matter of the application relates to a monitoring system for a data processing unit for visual representation of internal sequences. The data processing unit has a sequence program. The sequence program enters into connection with peripheral equipment of the data processing unit via an operating system. The data processing unit is connected with an evaluation unit via an interface such that by the data processing unit, items with information relating to internal sequences of the sequence program are transmitted to the evaluation unit via the interface, are evaluated, and are represented on a display screen.

From GB 2253542 A, a monitoring system is known that comprises the features described above.

For data processing installations, for the analysis of the individual internal sequences in the execution of a sequence program there are listing units, also called tracers, by those skilled in the art. For switching computers there are special call followers, also called call tracers by those skilled in the art. The listing units list the data received during a test run at the side of the operating system opposite the sequence program of the data processing units. After the test run, the data are available for subsequent evaluation.

It can hereby occur that the actual internal sequences can no longer be reconstructed unambiguously, because they may have been obscured on their path via the operating. An apparent error of the sequence program may actually have been caused by an error of the operating system. A nearly simultaneous co-tracing capacity is not given.

SUMMARY OF THE INVENTION

An object of the invention is to create a system for monitoring the individual internal sequences of a data processing units in which a tracing is given in real time.

According to the present invention, a data processing system has a data processing unit with a monitoring system. The data processing unit has a sequence program. The sequence program is in connection with peripheral equipment of the data processing unit via an operating system. The data processing unit is connected with an evaluation unit via an interface such that, by the data processing unit, items of information relating to internal sequences of the sequence program are transmitted to the evaluation unit via the interface, are evaluated, and are represented on the display screen. The data processing unit with the sequence program is supplemented by a program module that forwards items of information relating to the internal sequences of the sequence program immediately to the interface. The monitoring system according to the application includes a real-time representation of the internal sequences in a data processing unit, in particular in an ISDN (Integrated Services Digital Network) switching computer or a B-ISDN (Broadband Integrated Services Digital Network) switching computer, whereby an error representation caused by the operating system of the data processing unit is avoided. The monitoring system according to the application is free of interrupts for the sequence program and is thus largely free of feedback.

Further advantageous constructions of the subject matter of the application relate to the representation of the internal sequences as alphanumeric expressions, preferably for testing purposes, and the representation of the internal sequences as graphic elements, preferably for presentations.

BRIEF DESCRIPTION OF THE DRAWINGS

FIG. 1 shows a schematic representation of an arrangement formed by a switching unit and a personal computer, in which the monitoring system according to the application is realized;

FIG. 2 shows a schematic representation of further details of the monitoring system, FIG. 3 shows a display screen representation of individual internal sequences by means of alphanumeric characters; and FIG. 4 shows a display screen representation, with a irepresentation of the monitored computer, and of the peripheral apparatuses connected thereto, as graphic elements.

DESCRIPTION OF THE PREFERRED EMBODIMENTS

FIG. 1 shows a switching unit that is connected with peripheral equipment not shown in more detail. The switching unit enables message cells of a fixed length to be forwarded between the peripheral apparatuses in the course of bidirectional virtual connections, according to an asynchronous transmission method, in particular the ATM (Asynchronous Transfer Mode) method, in accordance with requests issued by the peripheral apparatuses. The peripheral apparatuses may be given by multimedia-capable apparatuses whose emitted or, supplied data rate is for example 30 Mbit/s. The switching unit comprises a switching computer that effects the setup or, initiation of the virtual connections. The switching computer comprises a serial interface SS that is connected with a serial interface of a commercially available personal computer. As is known, the personal computer, which serves as an evaluation unit, comprises among other things a hard-drive memory for the permanent storage of data, a working memory for the temporary storage of data, a processing unit (processor) for the processing of data, a keyboard for inputting data and a monitor as a display screen.

The switching computer of the switching installation is controlled by a sequence program that is given by the switching program shown in FIG. 2. By means of the exchange of messages, the switching program handles internal sequences such as e.g. the handling of incoming and outgoing signaling messages, as well as other events.

Conventional computers come into connection with the circuit environment, also designated hardware by those skilled in the art, exclusively via the operating system. The present switching computer is placed into connection with the peripheral equipment via the operating system. According to the application, the switching program is supplemented by a program module VPER. The program module VPER receives the calls coming from the switching program, which carry information concerning the internal sequences, and forwards them to the serial hardware interface SS, without going via the operating system. The program module VPER operates without the use of interrupts, whereby the switching-oriented processes in the switching computer are not modified. The time characteristic of the switching computer is worsened only inessentially by the addition of the program module VPER to the switching program. The program module VPER thus acquires the individual internal sequences of the switching program and forwards items of information relating to these sequences to the interface SS in short form.

The evaluation unit formed by the personal computer comprises a program PER for real-time call display that is connected with the program module VPER via the interface SS. The program PER uses the possibilities of interrupt controlling in order simultaneously to receive the items of information sent in unbraked fashion from VPER, to provide them with a time stamp and to buffer them in the working memory. The program PER carries out a logical evaluation of the items of information sent by the program module VPER, and using this information determines the corresponding processes being executed in the switching unit. From the internal sequences characteristic for a particular switching-oriented process, such as e.g. the setting up of a connection, the program PER infers the switching-oriented process itself.

VPER thus forms the connecting element between the calls coming from the switching program, which carry information concerning incoming and outgoing signaling messages there as well as other events, and the external real-time call display.

Via the program PER for real-time call display activated in the evaluation units, the program module VPER can be activated remotely by unit of an input via the keyboard of the evaluation unit.

The program module VPER receives from the evaluation unit commands for the synchronous changeover of the baud rate (from 9600 to 115200 baud) and for the selection of the desired filtering function, in order to influence the quantity of information transmitted for the real-time call display (from "no information," through brief summaries, up to complete signaling messages).

The program PER permits a permanent storing of the data received for a test run from the program module VPER on the hard drive of the evaluation unit in a log data file. The stored data of a test run are available for a later evaluation.

In what is called a test mode, an item of information sent by the program module VPER is shown in the form of alphanumeric characters, as an expression explicitly designating the relevant internal sequence. FIG. 3 shows a display screen representation in which a possible sequence of internal sequences are shown line-by-line as alphanumeric expressions. Specifically, the display screen output shows a message sequence (messages in short form) that has been exchanged for the setup and immediately subsequent dismantling of a call between two peripheral apparatuses and the local switching unit. The screen display using alphanumeric characters in a test mode gives the expert technician a nearly delay-free display concerning the current internal sequences in the switching unit.

FIG. 4 shows the screen display of the evaluation unit in what is called a presentation mode, whereby the switching unit and the peripheral unit connected therewith are shown as graphic elements. The items of information sent by the program module VPER are thereby shown as an animated element between the graphic elements. Thus, for example, a set-up bidirectional connection between the peripheral installation 102 and 104 is shown as a line routed via the switching unit, whereby for better illustration small rectangles representing message cells move on the line in both directions of transmission. A request, emitted by a peripheral apparatus to the switching unit, for the initiation of a connection is shown as a packet designated 'release,' moved from the peripheral unit 104 to the switching unit. The speed of the modification of the content of the screen representation, in particular of the speed of movement of graphic elements, is slowed down to the speed of comprehension of the observer. In presentation mode, a screen representation of the internal sequences of the switching computer is given with great descriptive power even for an observer not skilled in the art. The presentation mode is suitable for the eye-catching testing of a new switching program, but also for presentations before the general public at fairs and exhibitions.

The subject matter of the application has been described for the example of a switching computer of a switching unit; however, the subject matter of the application is also unproblematically applicable to data processing units comprising a similar construction, and relates to these data processing units without limitation.

Although various minor changes and modifications might be proposed by those skilled in the art, it will be understood that our wish is to include within the claims of the patent warranted hereon all such changes and modifications as reasonably come within our contribution to the art.

What is claimed is:

1. A data processing system, comprising:
    a data processing unit with a monitoring system;
    the data processing unit having a sequence program;
    the sequence program being in connection with peripheral equipment of the data processing unit via an operating system;
    the data processing unit being connected with an evaluation unit via an interface such that, by the data processing unit, items of information relating to internal sequences of the sequence program are transmitted to the evaluation unit via the interface, are evaluated, and are represented on a display screen; and
    the data processing unit with the sequence program being supplemented by a program module that immediately forwards items of information via an additional separate output to the evaluation unit relating to the internal sequences of the sequence program without going via the operating system and wherein switching-oriented processes in the data processing unit are not modified.

2. The system according to claim 1 wherein the program module allocates respective items of information to the internal sequences in short form.

3. The system according to claim 1 wherein the evaluation unit comprises a personal computer, and the representation takes place on a monitor of the personal computer.

4. The system according to claim 1 wherein in the evaluation unit the items of information are provided with time stamps and are stored.

5. The system according to claim 1 wherein an internal sequence is represented in the form of alphanumeric characters as an expression explicitly designating the internal sequence.

6. The system according to claim 5 wherein different types of internal sequences are represented by alphanumeric characters of different colors.

7. The system according to claim 1 wherein the data processing unit and peripheral equipment are represented in the screen display as graphic elements, and an internal sequence is shown as an animated element between the graphic elements.

8. The system according to claim 1 wherein the data processing unit comprises a switching computer, and the sequence program comprises a switching-oriented program.

9. The system according to claim 1 wherein the data processing unit comprises a switching computer.

10. A method for monitoring a data processing unit for visual representation of internal sequences, and wherein the data processing unit has a sequence program in connection with peripheral equipment of the data processing unit via an operating system, comprising the steps of:

connecting the data processing unit with an evaluation unit via an interface such that, by the data processing unit, items of information relating to internal sequences of the sequence program are transmitted to the evaluation unit via the interface, are evaluated, and are represented at a display screen; and supplementing the data processing unit with the sequence program by a program module, and utilizing the program module to immediately forward items of information via an additional separate output via the interface to the evaluation unit relating to the internal sequences of the sequence program without going via the operating system.

* * * * *